(12) United States Patent
Tan et al.

(10) Patent No.: US 6,850,425 B2
(45) Date of Patent: Feb. 1, 2005

(54) PARALLEL INVERTER SYSTEM BASED ON TRACKING OF SYSTEM POWER REFERENCE

(75) Inventors: Jingtao Tan, Neihu Taipei (TW); Jianping Ying, Neihu Taipei (TW); Hua Lin, Neihu Taipei (TW)

(73) Assignee: Delta Electronics, Inc., Taoyuan (TW)

( * ) Notice: Subject to any disclaimer, the term of this patent is extended or adjusted under 35 U.S.C. 154(b) by 26 days.

(21) Appl. No.: 10/340,697

(22) Filed: Jan. 10, 2003

(65) Prior Publication Data

US 2004/0136214 A1 Jul. 15, 2004

(51) Int. Cl.$^7$ .............................................. H02M 7/00
(52) U.S. Cl. ......................................... 363/65; 363/71
(58) Field of Search ............................ 363/71, 66, 41, 363/37, 39, 34, 72, 95, 65, 132; 307/66, 23.2

(56) References Cited

U.S. PATENT DOCUMENTS 5,377,092 A * 12/1994 Rowand et al. ............... 363/41
5,473,528 A * 12/1995 Hirata et al. .................. 363/71

* cited by examiner

*Primary Examiner*—Rajnikant B. Patel
(74) *Attorney, Agent, or Firm*—Volpe and Koenig, P.C

(57) ABSTRACT

A parallel inverter system includes a plurality of inverters of an instantaneous voltage control type, an output bus, an active power bus, a phase bus, and controlling devices. The output bus is used for connecting outputs of said plurality of inverters to a load. The active power bus is connected to the plurality of inverters so as to provide an active power sharing reference. The phase bus is connected to the plurality of inverters so as to provide a system phase reference. And, controlling devices control sinusoidal wave references of inverters to have the same phase, the reactive power, and the active power responsive to the active power sharing reference and the system phase reference. The related methods are also discussed.

20 Claims, 5 Drawing Sheets

US 6,850,425 B2

PARALLEL INVERTER SYSTEM BASED ON TRACKING OF SYSTEM POWER REFERENCE

FIELD OF THE INVENTION

The present invention relates to a parallel inverter system including a plurality of inverters operated in parallel, and more particularly to a parallel inverter system capable of keeping load current sharing balance between inverters even in the case where a load undergoes a sudden change.

BACKGROUND OF THE INVENTION

FIG. 1 shows a schematic view of a parallel operational system of a conventional AC output inverter disclosed in U.S. Pat. No. 5,212,630. Referring to FIG. 1, a first inverter device 11 operates in parallel with a second inverter device 12, which has like construction, through an output bus 13, and supplies electric power to a load 14. The first inverter device 11 is mainly composed of an inverter body 110, a reactor 111 and condenser 112 serving as a filter. In order to operate the first and second inverter in parallel, a detection signal $I_{1a}$ is obtained from an output current $1_1$ of the first inverter device 11 by a current transformer 120a, and a difference between the detection signal $I_{1a}$ and $I_{2a}$ similarly obtained from the second inverter device 12, that is a signal corresponding to cross current is obtained by a cross current detector 151. Then two orthogonal vectors $E_A$ and $E_B$ are generated by a phase shifter 150, and a reactive power corresponding power component and an active power component are obtained from the signal by arithmetic circuits 152, 153. A voltage control circuit 143 performs pulse width modulation for the inverter body 110 through a PWM circuit 140 based on signals from a voltage setting circuit 17 and a voltage feedback circuit 130, thereby controlling the internal voltage.

The above reactive power corresponding component is supplied as a supplementary signal to the voltage control circuit 143, and the internal voltage of the inverter body is adjusted that $\Delta Q$ becomes zero.

On the other hand, the active power corresponding component is input to a reference oscillator 156 through a PLL amplifier circuit 154, and the phase of the internal voltage of the inverter body is adjusted that $\Delta P$ becomes zero.

Since the voltage and phase are thus controlled that $\Delta Q$ and $\Delta P$ become zero, no cross current exists between the two inverters and stable load sharing is achieved.

However, the conventional parallel operational system of inverters has the following problems. First, since shared currents are balanced by controlling the phase and an average value of the internal voltage of the inverters, it is difficult to improve the response speed of control, and in particular, it is impossible to control instantaneous cross current. Secondly, since a filter is necessary to detect an active component and reactive component of the cross current separately, the cross current cannot be controlled at high speed. Therefore, there is a limit in applying the system to high-speed voltage control, for an example, instantaneous voltage control, which ensures that an output of the inverter a sine wave of high quality with little distortion. Thirdly, a current sharing bus is required to provide the instantaneous current signal, which is an analogy signal. Therefore, the sharing bus should have wide bandwidth, which makes the Electromagnetic Interference (EMI) easily disturb the stability of the system and it is impossible to use digital communication bus to transfer instantaneous current information.

It is therefore attempted by the applicant to deal with the above situation encountered with the prior art.

SUMMARY OF THE INVENTION

It is therefore an object of the present invention to propose a parallel inverter system capable of keeping load current sharing balance between inverters even in the case where a load undergoes a sudden change.

It is therefore another object of the present invention to propose a control method for providing an average value of active power references of the plurality of inverters and a maximum value of phase references of the plurality of inverters so as to control sinusoidal wave references of inverters to have the same phase, the reactive power, and the active power responsive to the active power sharing reference and the system phase reference.

It is therefore further object of the present invention to propose an adaptive control method of voltage feedback coefficient for enforcing the output voltage feedback coefficients of parallel inverters being equal to each other.

According to an aspect of the present invention, a parallel inverter system includes a plurality of inverters of an instantaneous voltage control type, an output bus for connecting outputs of the plurality of inverters to a load, an active power bus for connecting to the plurality of inverters so as to provide an active power sharing reference, a phase bus for connecting to the plurality of inverters so as to provide a system phase reference, and controlling devices for controlling sinusoidal wave references of inverters to have the same phase, the reactive power, and the active power responsive to the active power sharing reference and the system phase reference.

Preferably, the active power sharing reference is an average value of active power references of the plurality of inverters.

Preferably, the active power sharing reference is a maximum value of active power references of the plurality of inverters.

Preferably, the active power sharing reference is a minimum value of active power references of the plurality of inverters.

Preferably, the system phase reference is the maximum value of phase references of the plurality of inverters.

Preferably, the system phase reference is a minimum value of phase references of the plurality of inverters.

Preferably, the system phase reference is an average value of phase references of the plurality of inverters.

It is therefore another aspect of the present invention to propose a parallel inverter system which includes a plurality of inverters of an instantaneous voltage control type, an output bus for connecting outputs of the plurality of inverters to a load, an active power bus for connecting to the plurality of inverters so as to provide an active power sharing reference, a phase bus for connecting to the plurality of inverters so as to provide a system phase reference, and each of controlling devices for controlling sinusoidal wave references of inverters to have the same phase, the reactive power, and the active power, including a voltage sensor electrically connected to the output of the inverter for sensing an output voltage of the plurality of inverters, a RMS voltage calculator electrically connected to the voltage sensor for calculating a RMS value of the sensed output voltage, a RMS voltage controller electrically connected to the RMS voltage calculator for producing an active power reference to the active power bus, wherein the active power sharing reference is synthesized through the active power bus, an active power controller electrically connected to the active power bus for reducing an error between the active power sharing reference and an active power flow of the inverter, a PLL controller electrically to the phase bus for producing the system phase reference through the phase bus, and a sinusoidal reference generator electrically connected to the active power controller and the PLL controller so as to produce the sinusoidal wave reference of the inverter to have the same phase, the reactive power, and the active power with each other inverters.

Preferably, each of controlling devices further includes an adaptive controller of voltage feedback coefficient electrically connected to the RMS voltage controller and the phase bus for enforcing the output voltage feedback coefficients of parallel inverters being equal to each other.

It is therefore further aspect of the present invention to propose a control method for the parallel inverter system having a plurality of inverters of an instantaneous voltage control type, an output bus for connecting outputs of the plurality of inverters to a load, which includes the steps of providing a system phase reference, providing a system phase reference, and controlling sinusoidal wave references of inverters to have the same phase, the reactive power, and the active power responsive to the active power sharing reference and the system phase reference.

Preferably, the system phase reference is an average value of phase references of the plurality of inverters.

Preferably, the system phase reference is a minimum value of phase references of the plurality of inverters.

Preferably, the system phase reference is a maximum value of phase references of the plurality of inverters.

Preferably, the active power sharing reference is an average value of active power references of the plurality of inverters.

Preferably, the active power sharing reference is a maximum value of active power references of the plurality of inverters.

Preferably, the active power sharing reference is a minimum value of active power references of the plurality of inverters.

It is therefore more an aspect of the present invention to propose a control method for the parallel inverter system having a plurality of inverters of an instantaneous voltage control type, an output bus for connecting outputs of the plurality of inverters to a load, which includes the steps of providing an active power sharing reference which is an average value of active power references of the plurality of inverters, providing a system phase reference which is the maximum value of phase references of the plurality of inverters, each of controlling devices for controlling sinusoidal wave references of inverters to have the same phase, the reactive power, and the active power, including the steps of sensing an output voltage of the plurality of inverters, calculating a RMS value of the sensed output voltage, producing an active power reference in which the active power sharing reference is synthesized through an active power bus, reducing an error between the active power sharing reference and an active power flow of the inverter, producing the system phase reference through a phase bus, and producing the sinusoidal wave reference of the inverter to have the same phase, the reactive power, and the active power with each other inverters.

Preferably, the control method further includes an adaptive control of voltage feedback coefficient for enforcing the output voltage feedback coefficients of parallel inverters being equal to each other.

The present invention may best be understood through the following description with reference to the accompanying drawings, in which:

DETAILED DESCRIPTION OF THE PREFERRED EMBODIMENT

Although this invention is susceptible to embodiments of many different forms, a preferred embodiment will be described and illustrated in detail herein. The present disclosure exemplifies the principle of the invention and is not being considered a limitation to the broader aspects of the invention to the particular embodiment as described.

Figure 1:
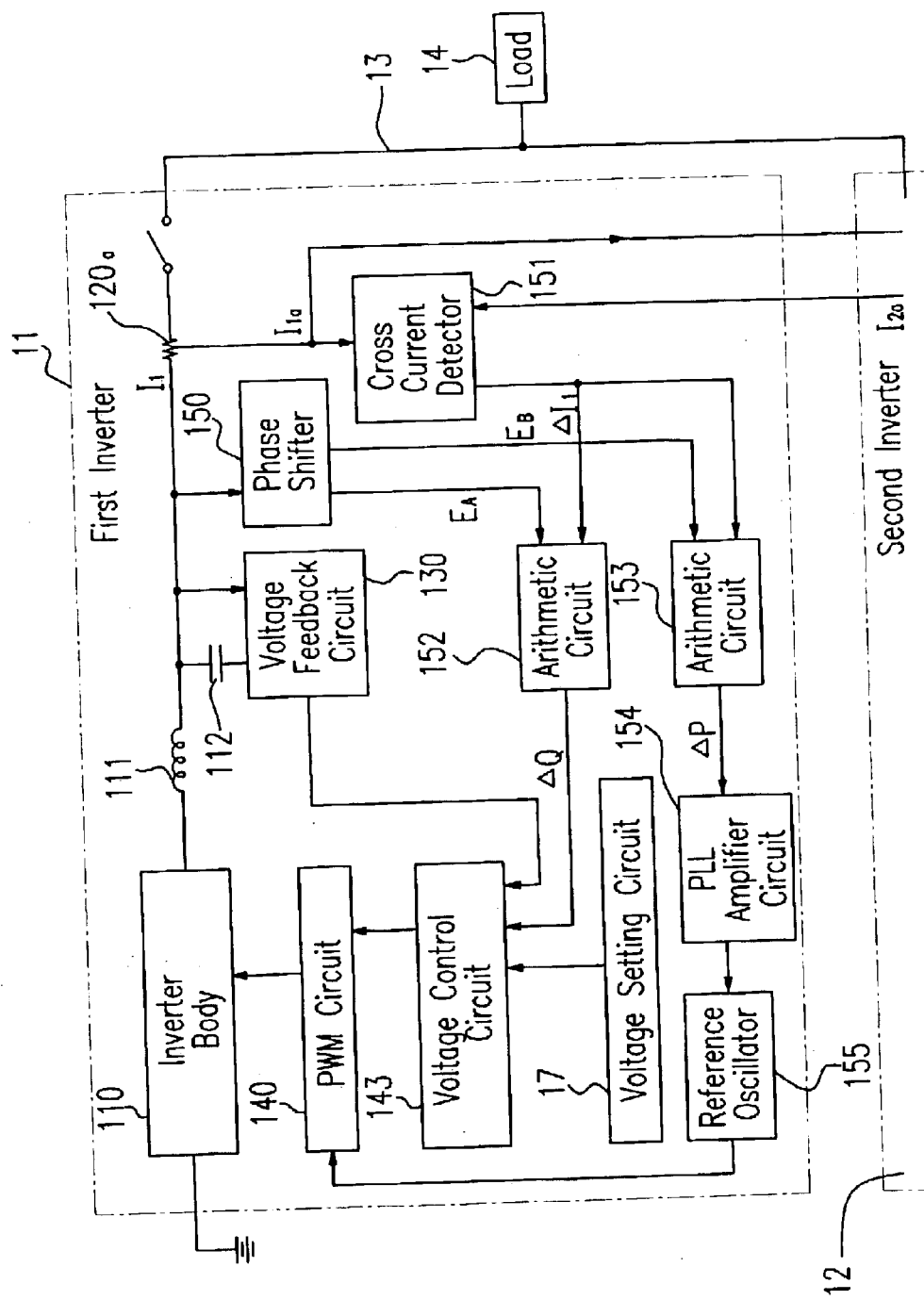
FIG. 1 is a block diagram of a conventional parallel operational system.
Figure 2:
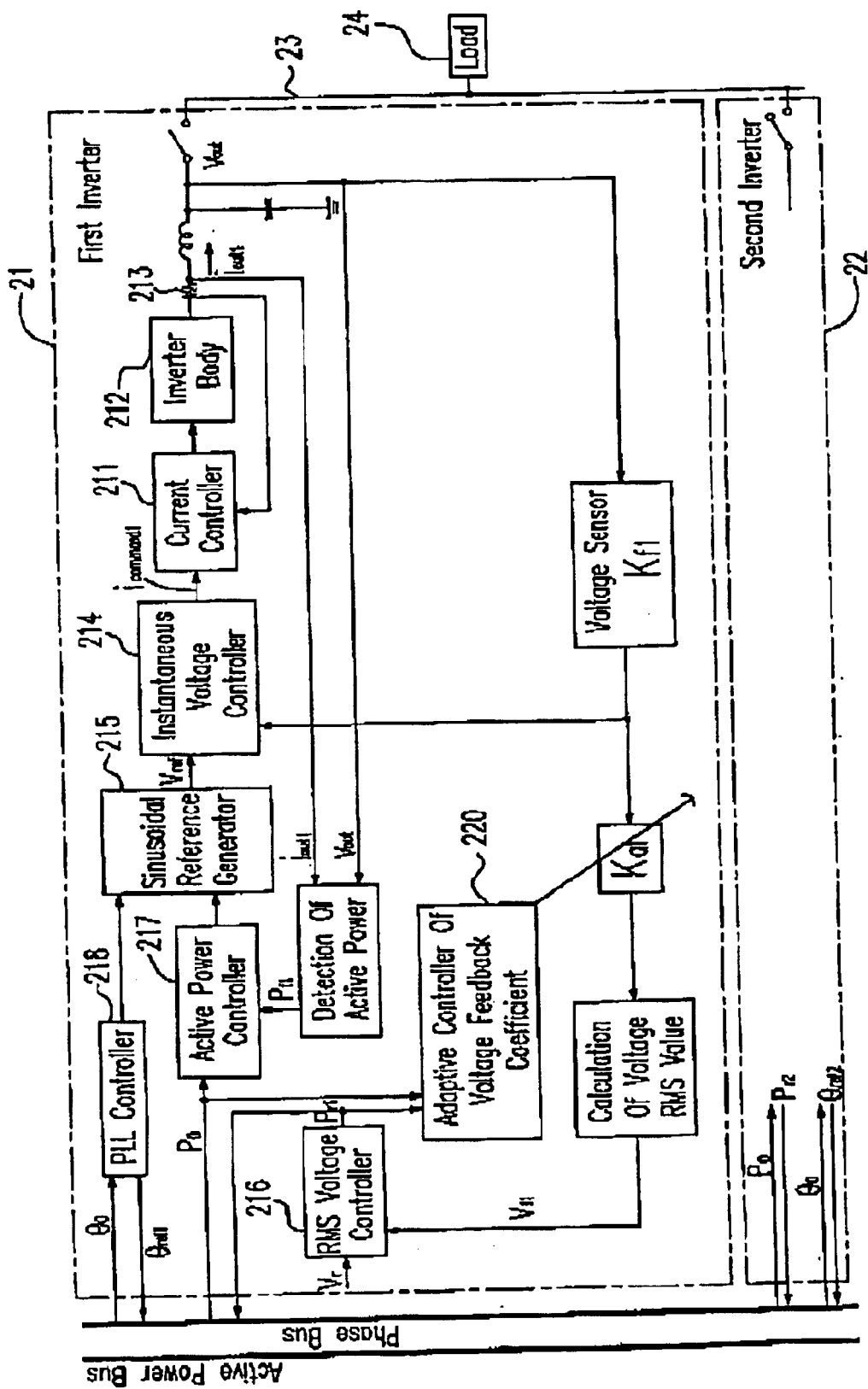
FIG. 2 is a block diagram showing a parallel operating system for A.C. output inverters according to a preferred embodiment of the present invention.

FIG. 2 is a block diagram showing a parallel operating system for AC output inverters according to a preferred embodiment of the present invention. Referring to FIG. 2, a first inverter 21 is in parallel operation with a second inverter 22, which has like construction, through an output bus 23 for supplying power to a load 24.

The first inverter 21 includes a current minor loop which is composed of a current controller 211, an inverter body 212, and a current sensor 213. The current controller 211 delivers PWM signals to the inverter body 212, which is based on an output current $i_{out1}$ fed back through the current sensor 213 and a current command $i_{command1}$ from an instantaneous voltage controller 214, and thereby the output current $i_{out1}$ coincides with the current command $i_{command1}$. Meanwhile, a sinusoidal reference generator 215 produces a sinusoidal wave voltage reference $V_{ref}$. The instantaneous voltage controller 214 produces a current command $i_{command1}$ for the inverter to correct the discrepancy between the output voltage $V_{out}$ and the sinusoidal wave voltage reference $V_{ref}$. Thus, the instantaneous voltage controller 214 and the current controller 211 can ensure the UPS has good dynamic response and low THD (total harmonic distortion). Therefore, the key point of this invention is how to generate the sinusoidal wave voltage reference so that active power sharing and reactive power sharing can be implemented in the parallel inverter system.

In order to transfer the useful information among the paralleled inverters, two sharing buses including a phase bus and an active power bus are applied in the parallel inverter system. The active power bus provides a common system active power reference $P_0$ and the phase bus provides a phase reference $\theta_0$. The principles of the active and reactive power sharing are described as follows.

(1) Active Power Sharing

According to the present invention, the active power flow $P_n$, i=1, 2, . . . is primarily determined by the amplitude of the voltage reference $V_r$. That is to say, as long as the amplitudes of every voltage reference for the paralleled inverters are regulated adequately, the active power flow $P_{ri}$, i=1, 2, . . . among the inverters will be shared naturally.

Figure 3:
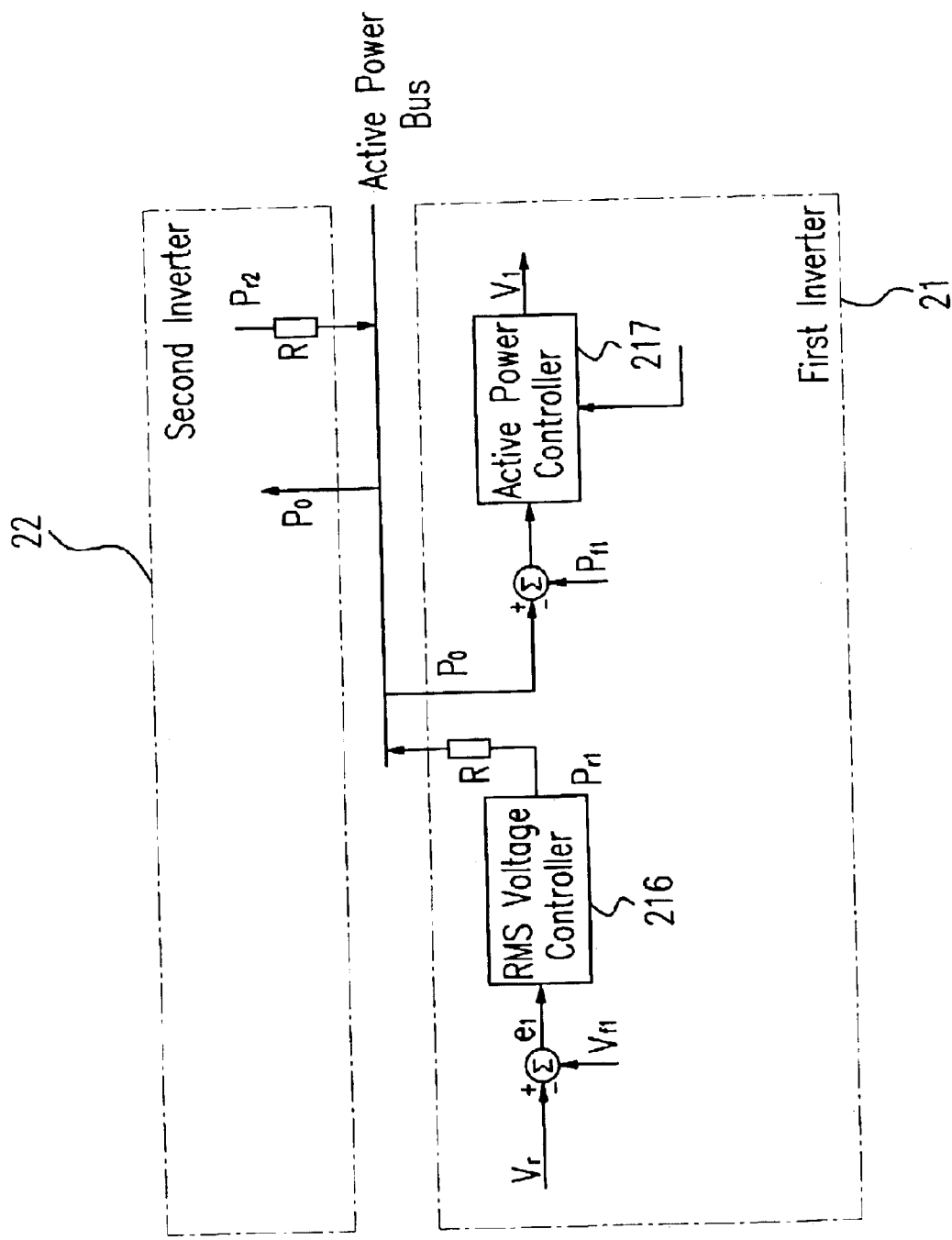
FIG. 3 is a block diagram of the active power bus, the RMS voltage controller, and the active power controller shown in FIG. 2.

As shown in FIG. 3, a RMS voltage controller 216 is a proportional-integral controller, as shown in Equation (1).

$$\begin{cases} e_1 = V_r - V_{f1} \\ P_{r1} = K_P e_1 + K_I \int e_1 dt \end{cases} \quad (1)$$

Here, it should be noticed that the block named calculation of voltage RMS value calculates the RMS value $V_{f1}$ of the output voltage $V_{out}$ and the RMS voltage controller ensures the RMS value of the output voltage $V_{f1}$ to track that of the voltage reference $V_r$ completely. In Equation (1), $K_p$ represents a proportional coefficient and $K_1$ represents an integral coefficient. Numerals $P_{r1}$ and $P_{r2}$ are the outputs of the RMS voltage controller of the first inverter 21 and the second inverter 22, which are regarded as the active power reference of the parallel inverters.

The active power reference of the parallel inverters $P_{r1}$ and $P_{r2}$ are sent to the active power bus to synthesize the system active power reference $P_0$. In FIG. 3, the system active power reference $P_0$ is the average value of the active power references $P_{r1}$ and $P_{r2}$ of all the inverters paralleled in the system, which can be expressed as:

$$P_0 = \frac{P_{r1} + P_{r2}}{2} \quad (2)$$

In this case, the system active power reference $P_0$ is the average value of the active power references $P_{r1}$ and $P_{r2}$ of all the inverters. However, the system active power reference $P_0$ may be the maximum value, the minimum value, or any combination of the active power references $P_{r1}$ and $P_{r2}$ of all the inverters.

At last, the system active power reference $P_0$ will be distributed to each inverter as the reference of the active power controller by the active power bus. In the first inverter 21, an active power controller 217 is also a proportional-integral regulator, which reduces the error between the system active power reference $P_0$ and the active power flow $P_{f1}$ of the first inverter 21 by regulating the amplitude of sinusoidal wave voltage reference $V_{ref}$. There is similarly operation in the second inverter 22. Thus, the active power flow among the parallel inverters is shared only if the performance of the inner loop in every inverter is good.

(2) Reactive Power Sharing

Figure 4:
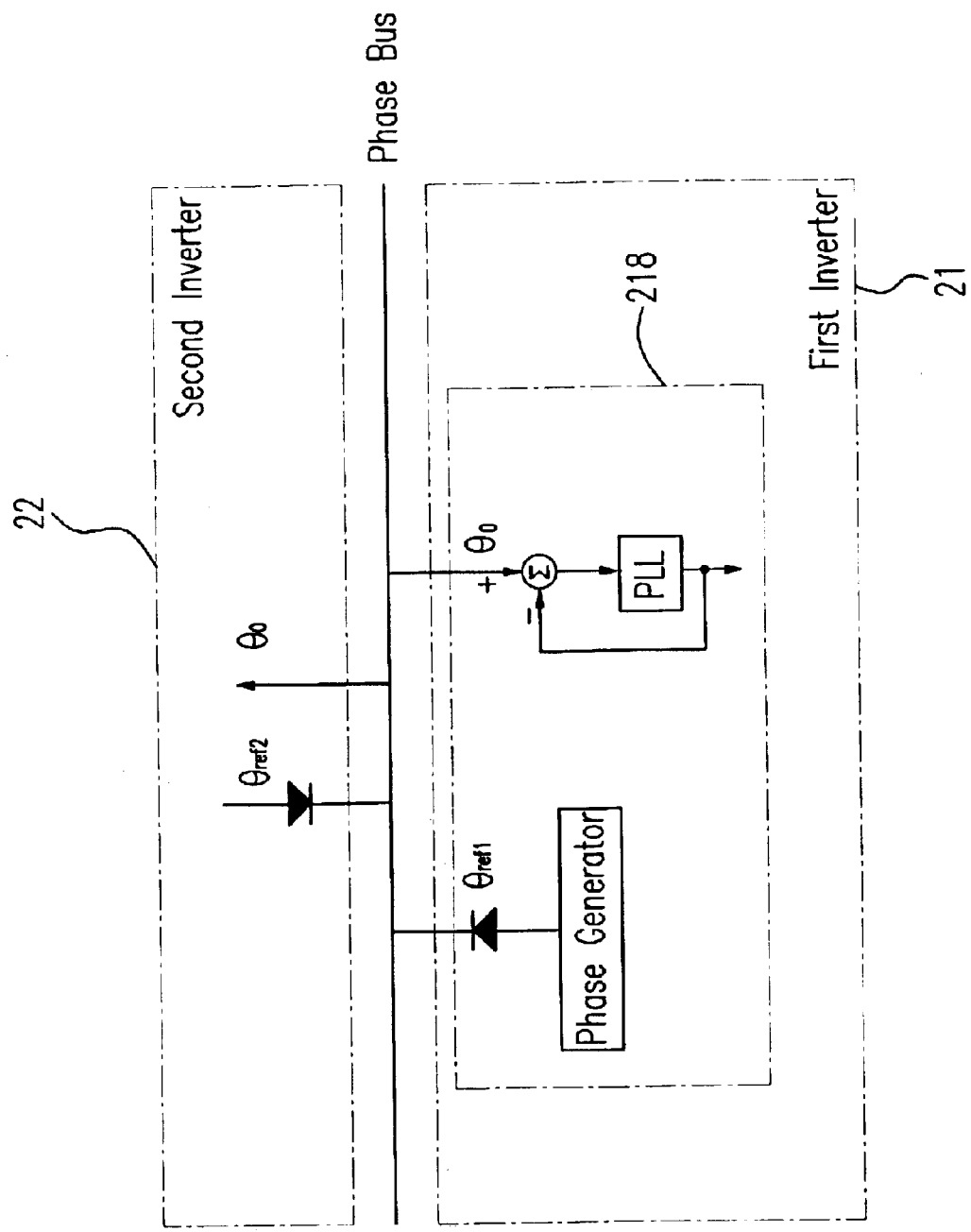
FIG. 4 is a block diagram of the phase bus, the phase generator, and the PLL controller shown in FIG. 2.

In addition, according to the present invention, the reactive power flow is predominantly determined by the phase angle of the sinusoidal wave reference. Hence the reactive power sharing depends on the regulation of the phase angle. All the inverters in the parallel system are required to synchronize with themselves, so that reactive power can be shared effectively. FIG. 4 shows the scheme of the synchronization of the parallel system with the phase bus.

Every inverter owns a phase generator to generate a phase reference. Meanwhile, $\theta_{ref1}$ is a phase reference generated in the first inverter 21 and $\theta_{ref2}$ is a phase reference generated in the second inverter 22. $\theta_{ref1}$ and $\theta_{ref2}$ are all sent to the phase bus through diodes to synthesize the system phase reference $\theta_0$. In FIG. 4, the system active power reference $\theta_0$ is the maximum value of the phase references of all the inverters connected in parallel, which can be expressed as:

$$\theta_0 = \max(\theta_{ref1}, \theta_{ref2}) \quad (3)$$

It should be noticed that the system active power reference $\theta_0$ is the maximum value of the phase references of all the inverters in this case. Actually, the system active power reference $\theta_0$ may be the minimum value, the average value, or any combination of the phase references of all the inverters.

At last, the system phase reference $\theta_0$ will be distributed to each inverter as the reference of the PLL controller by the phase bus. Thus, this scheme enforces the sinusoidal wave reference of all the inverters to have the same phase angle and the reactive power is shared effectively in the parallel system.

In the parallel system, all the controllers can be implemented by software, so the control parameters among parallel inverter modules have no difference. But, in general, it may have differences between system parameters of all the inverters, such as the voltage feedback coefficient, which relies on the parameters of voltage sensor. Due to the discrepancy of the coefficient, although the output voltage $V_{out}$ is the same one, the voltage feedback of the inverters is different. Hence the RMS values of the load voltage feedback between all inverters are different.

In the first inverter 21, $K_{f1}$ is the voltage feedback coefficient, $e_1$ is the error between the reference $V_r$ and the RMS value $V_{f1}$ of the output voltage $V_{out}$ feedback, which can be expressed as:

$$e_1 = V_r - K_{f1} * V_{out} \quad (4)$$

Similarly, in the second inverter 22, $$e_2 = V_r - K_{f2} * V_{out} \quad (5)$$

Obviously, when $K_{f1}$ is not equal to $K_{f2}$, $e_1$ and $e_2$ cannot be reduced to zero at the same time. For example, when $K_{f1} < K_{f2}$, if $e_2 = 0$, then $e_1 > 0$.

Because there exists an integrator section in the RMS voltage controller 216 of the first inverter 21, the RMS voltage controller 216 will be in the positive saturation state. Thus, the system cannot work under a normal operation.

To overcome this problem, an adaptive controller 220 is adopted. The adaptive control law is:

$$V_{f1} = K_{a1} * K_{f1} * V_{out} \quad (6)$$

$$K_{a1} = K_0 (P_0 - P_{r1}) + 1 \quad (7)$$

$K_{a1}$ is used as a part of the voltage feedback coefficient which can be modified by the adaptive control law. $K_0$ is the proportional coefficient of the adaptive controller 220. Therefore, the product of $K_{a1}$ and $K_{f1}$ is used as the actual feedback coefficient.

Similarly, in the second inverter 22, the adaptive control law can be expressed as:

$$V_{f2} = K_{a2} * K_{f2} * V_{out} \quad (8)$$

$$K_{a2} = K_0 (P_0 - P_{r2}) + 1 \quad (9)$$

The adaptive control law can enforce the output voltage feedback coefficients of parallel inverters are equal to each other. That is to say, using the adaptive control law will make the system to work under a normal operation.

Figure 5:
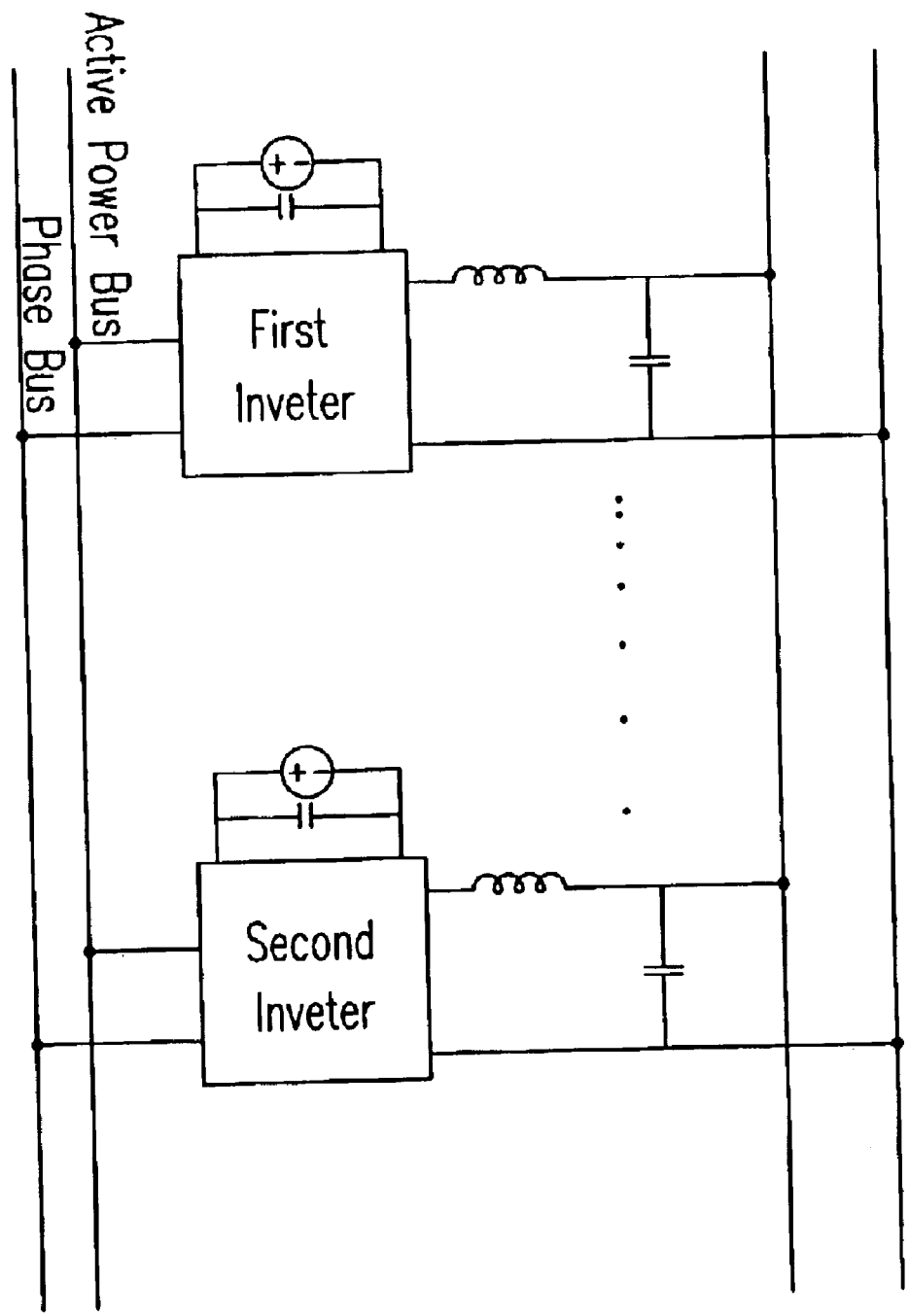
FIG. 5 is a circuit diagram showing a parallel operating system for A.C. output inverters according to a preferred embodiment of the present invention.

Please refer to FIG. 5. FIG. 5 shows the parallel operating system for A.C. output inverters.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A parallel inverter system comprising:
   a plurality of inverters of an instantaneous voltage control type each having an instantaneous voltage controller and a current minor loop coupled to said instantaneous voltage controller for receiving a current command;
   an output bus for connecting outputs of said plurality of inverters to a load;
   an active power bus for connecting to said plurality of inverters so as to provide an active power sharing reference generated from active power references of said plurality of inverters and through said active power bus;
   a phase bus for connecting to said plurality of inverters so as to provide a system phase reference generated from phase references of said plurality of inverters and through said phase bus; and
   controlling devices for controlling sinusoidal wave references of said plurality of inverters to have the same phase, the reactive power, and the active power responsive to said active power sharing reference and said system phase reference;
   wherein a plurality of discrepancies between said outputs and said sinusoidal wave references of said plurality of inverters are corrected by said instantaneous voltage controllers and said current minor loops of said plurality of inverters.

2. The parallel inverter system according to claim 1, wherein said active power sharing reference is an average value of said active power references of said plurality of inverters.

3. The parallel inverter system according to claim 1, wherein said active power sharing reference is a maximum value of said active power references of said plurality of inverters.

4. The parallel inverter system according to claim 1, wherein said active power sharing reference is a minimum value of said active power references of said plurality of inverters.

5. The parallel inverter system according to claim 1, wherein said system phase reference is a maximum value of said phase references of said plurality of inverters.

6. The parallel inverter system according to claim 1, wherein said system phase reference is a minimum value of said phase references of said plurality of inverters.

7. The parallel inverter system according to claim 1, wherein said system phase reference is an average value of said phase references of said plurality of inverters.

8. A parallel inverter system comprising:
   a plurality of inverters of an instantaneous voltage control type each having an instantaneous voltage controller and a current minor loop coupled to said instantaneous voltage controller for receiving a current command;
   an output bus for connecting outputs of said plurality of inverters to a load;
   an active power bus for connecting to said plurality of inverters so as to provide an active power sharing reference;
   a phase bus for connecting to said plurality of inverters so as to provide a system phase reference; and
   each of controlling devices for controlling sinusoidal wave references of said plurality of inverters to have the same phase, the reactive power, and the active power, comprising:
   a voltage sensor electrically connected to said output of said inverter for sensing an output voltage of said plurality of inverters;
   a RMS voltage calculator electrically connected to said voltage sensor for calculating a RMS value of said sensed output voltage;
   a RMS voltage controller electrically connected to said RMS voltage calculator for producing an active power reference to said active power bus, wherein said active power sharing reference is synthesized through said active power bus and from said active power references of said plurality of inverters;
   an active power controller electrically connected to said active power bus for reducing an error between said active power sharing reference and an active power flow of said inverter;
   a PLL controller electrically connected to said phase bus for producing said system phase reference through said phase bus and from phase references of said plurality of inverters; and
   a sinusoidal reference generator electrically connected to said active power controller and said PLL controller so as to produce said sinusoidal wave reference of said inverter to have the same phase, the reactive power, and the active power with each other inverters;
   wherein a plurality of discrepancies between said outputs and said sinusoidal wave references of said plurality of inverters are corrected by said instantaneous voltage controllers and said current minor loops of said plurality of inverters.

9. The parallel inverter system according to claim 8, wherein said each of controlling devices further comprises an adaptive controller of voltage feedback coefficient electrically connected to said RMS voltage controller and said phase bus for enforcing the output voltage feedback coefficients of said plurality of inverters being equal to each other.

10. A control method for the parallel inverter system having a plurality of inverters of an instantaneous voltage control type each having an instantaneous voltage controller and a current minor loop coupled to said instantaneous voltage controller for receiving a current command, and an output bus for connecting outputs of said plurality of inverters to a load, comprising the steps of:
   providing an active power sharing reference generated from active power references of said plurality of inverters;
   providing a system phase reference generated from phase references of said plurality of inverters;
   controlling sinusoidal wave references of said plurality of inverters to have the same phase, the reactive power, and the active power responsive to said active power sharing reference and said system phase reference; and
   correcting a plurality of discrepancies between said outputs and said sinusoidal wave references of said plurality of inverters by said instantaneous voltage controllers and said current minor loops of said plurality of inverters.

11. The control method according to claim 10, wherein said system phase reference is an average value of said phase references of said plurality of inverters.

12. The control method according to claim 10, wherein said system phase reference is a minimum value of said phase references of said plurality of inverters.

13. The control method according to claim 10, wherein said system phase reference is a maximum value of said phase references of said plurality of inverters.

14. The control method according to claim 10, wherein said active power sharing reference is an average value of said active power references of said plurality of inverters.

15. The control method according to claim 10, wherein said active power sharing reference is a maximum value of said active power references of said plurality of inverters.

16. The control method according to claim 10, wherein said active power sharing reference is a minimum value of said active power references of said plurality of inverters.

17. A control method for the parallel inverter system having a plurality of inverters of an instantaneous voltage control type each having an instantaneous voltage controller and a current minor loop coupled to said instantaneous voltage controller for receiving a current command, and an output bus for connecting outputs of said plurality of inverters to a load, comprising the steps of:

sensing an output voltage of said plurality of inverters;

calculating a RMS value of said sensed output voltage;

producing an active power reference of said plurality of inverters according to said RMS value;

producing an active power sharing reference through an active power bus and from an average value of said active power references of said plurality of inverters;

reducing an error between said active power sharing reference and an active power flow of said inverter;

producing a system phase reference through a phase bus and from a maximum value of phase references of said plurality of inverters;

producing said sinusoidal wave reference of said inverter to have the same phase, the reactive power, and the active power with each other inverters; and correcting a plurality of discrepancies between said outputs and said sinusoidal wave references of said plurality of inverters by said instantaneous voltage controllers and said current minor loops of said plurality of inverters.

18. The control method according to claim 17, wherein said parallel inverter system further comprises an adaptive controller of voltage feedback coefficient for enforcing the output voltage feedback coefficients of said plurality of inverters being equal to each other.

19. The parallel inverter system according to claim 1, wherein said current minor loop further comprises a current controller coupled to said instantaneous voltage controller, an inverter body coupled to said current controller for receiving a PWM signal, and a current sensor coupled to said inverter body and said current controller for sensing an output current of said inverter body and sending a feedback of said output current to said current controller so as to generate said PWM signal.

20. The parallel inverter system according to claim 1, wherein each of said plurality of inverters further comprises a voltage sensor for sensing said outputs of said plurality of inverters and sending a feedback of each said sensed outputs of said plurality of inverters to said instantaneous voltage controller, and each of said sinusoidal wave references of said plurality of inverters is sent to said instantaneous voltage controller so as to generate said current command.

* * * * *